US007926051B2

(12) United States Patent
Barta et al.

(10) Patent No.: US 7,926,051 B2
(45) Date of Patent: Apr. 12, 2011

(54) AUTOMATIC PARALLEL NON-DEPENDENT COMPONENT DEPLOYMENT

(75) Inventors: Attila Barta, Toronto (CA); Kwasi A. Asare, Durham, NC (US); Richard D. Huddleston, Newtonville, MA (US); Daniel E. Jemiolo, Pascoag, RI (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 10/704,836

(22) Filed: Nov. 10, 2003

(65) Prior Publication Data

US 2005/0102665 A1    May 12, 2005

(51) Int. Cl.
*G06F 9/445* (2006.01)
*G06F 9/46* (2006.01)
(52) U.S. Cl. ....................................... 717/174; 718/106
(58) Field of Classification Search ........... 717/174–178
See application file for complete search history.

(56) References Cited

U.S. PATENT DOCUMENTS

| | | | | |
|---|---|---|---|---|
| 6,442,754 | B1 * | 8/2002 | Curtis ............................ | 717/175 |
| 6,460,175 | B1 * | 10/2002 | Ferri et al. ..................... | 717/103 |
| 6,744,450 | B1 * | 6/2004 | Zimniewicz et al. .......... | 715/841 |
| 6,918,112 | B2 * | 7/2005 | Bourke-Dunphy et al. .. | 717/177 |
| 6,965,887 | B2 * | 11/2005 | Huelsman et al. .............. | 706/47 |
| 2002/0133814 | A1 * | 9/2002 | Bourke-Dunphy et al. .. | 717/174 |
| 2003/0037327 | A1 * | 2/2003 | Cicciarelli et al. ............ | 717/178 |
| 2003/0120708 | A1 * | 6/2003 | Pulsipher et al. ............. | 709/106 |
| 2003/0182656 | A1 * | 9/2003 | Leathers et al. ............... | 717/177 |
| 2004/0255291 | A1 * | 12/2004 | Sierer et al. .................... | 717/174 |

OTHER PUBLICATIONS

An et al., "Getting Started with WebSphere Performance Benchmark Sample on Windows 2000", May 23, 2002; IBM Canada, pp. 1-12.*
An et al., "WebSphere and DB2 Calustring and Scalability Study—Installation and Configuration Guide", 2002; IBM Canada, pp. 1-19.*
Keller et al., "Dynamic Dependencies in Application Service Management", IBM Research, Jun. 2000, PDPTA 2000, pp. 1-7.*
Gerlach et al., "DPS—Dynamic Parallel Schedules", Apr. 22, 2003, IEEE, pp. 1-10.*
Mylopoulos et al., "Managing Knowledge for Strategic Business Analysts: The Executive Information Portal", Mar. 3, 2001, University of Toronto, Canada, pp. 1-18.*

* cited by examiner

*Primary Examiner* — Michael J Yigdall
*Assistant Examiner* — Ben C Wang
(74) *Attorney, Agent, or Firm* — Lee Law, PLLC; Christopher B. Lee (57) ABSTRACT

The methods, systems, data structures and computer program products for deploying software components are provided, including deploying components in an enterprise environment. Dependency relationships among components to be deployed are determined. Those components which are not dependent upon any other component may be installed first and substantially in parallel. Components which are dependent only upon the first installed components are next installed, substantially in parallel. Installation thus progresses until all components have been installed. By installing in parallel those components having a similar level of dependency, rather than installing all components sequentially, the deployment is more efficient and requires less time to complete.

19 Claims, 6 Drawing Sheets

```
INPUT:     a DAG representing the semantic model of the software
components
OUTPUT:    void
do while(there are nodes unmarked)
        // a leaf node is a node with incoming edges only
        if (there are leaf node)
                Nodes_to_install_in_parallel ← leaf nodes
        else
                Nodes_to_install_in_parallel ← chose randomly a node
                at the lowest level in the DAG Install(Nodes_to_install_in_parallel)

Delete the install nodes and their incoming edges ()
enddo
```

```
SystemOut      O ADMA6010I: The tasks are
[com.ibm.ws.management.application.task.ExtractionTask,
com.ibm.ws.management.application.task.CompileJspTask,
com.ibm.ws.management.application.task.ConfigureTask,
com.ibm.ws.management.application.task.BackupAppTask]
[4/7/03 10:31:46:171 EDT] 3ccab45e SystemOut     O ADMA6013I: Extract application binaries
at C:\DOCUME~1\sadtler\LOCALS~1\Temp\app_f4688a2b10\ear
[4/7/03 10:31:47:522 EDT] 3ccab45e SystemOut     O Compiling jsps in Database_Testing.war
[4/7/03 10:31:47:522 EDT] 3ccab45e SystemOut     O Invoking compilation ..
[4/7/03 10:31:49:746 EDT] 3ccab45e WebGroup      I SRVE0180I: [OnlineCatalog]
[/OnlineCatalog] [Servlet.LOG]:
[4/7/03 10:31:50:146 EDT] 3ccab45e WebGroup      I SRVE0180I: [OnlineCatalog]
[/OnlineCatalog] [Servlet.LOG]:
[4/7/03 10:31:53:131 EDT] 3ccab45e SystemOut     O Errors compiling jsps in
C:\DOCUME~1\sadtler\LOCALS~1\Temp\app_f4688a2b10\ear\Database_Testing.war
[4/7/03 10:31:53:131 EDT] 3ccab45e SystemOut     O Return code from jsp-compilation is: 1
[4/7/03 10:31:54:302 EDT] 3ccab45e SystemOut     O Exception in jsp compile:
com.ibm.websphere.management.exception.AdminException: ADMA0021E: Error in compiling jsps -
Database_Testing.war (rc=1)
[4/7/03 10:31:54:703 EDT] 3ccab45e SystemOut     O ADMA6012I: Exception in run
com.ibm.websphere.management.exception.AdminException: ADMA0021E: Error in compiling jsps -
Database_Testing.war (rc=1)
[4/7/03 10:31:54:703 EDT] 3ccab45e SystemOut     O Exception:
com.ibm.websphere.management.exception.AdminException: ADMA0021E: Error in compiling jsps -
Database_Testing.war (rc=1)
[4/7/03 10:31:54:703 EDT] 3ccab45e SystemOut     O ADMA6011I: Deleting directory tree
C:\DOCUME~1\sadtler\LOCALS~1\Temp\app_f4688a2b10
```

```
INPUT:    a DAG representing the semantic model of the software
components
OUTPUT:   void
do while(there are nodes unmarked)
        // a leaf node is a node with incoming edges only
        if (there are leaf node)
                Nodes_to_install_in_parallel ← leaf nodes
        else
                Nodes_to_install_in_parallel ← chose randomly a node
                at the lowest level in the DAG Install(Nodes_to_install_in_parallel)

Delete the install nodes and their incoming edges ()
enddo
```

FIG. 8

```
-- WAS
    -- IBM HTTP SERVER
        + CHECKS
        + DEPLOY
        + SETUP
        + CLEAN UP

+ IBM DB2 UDB

-- APPLICATION SERVER
        + WAS
        + SERVER PLUG-INS
        + APPLICATION ASSEMBLY AND DEPLOYMENT TOOL
        + DEPLOYMENT TOOL
        + APPLICATION SERVER EXAMPLES
        + MESSAGE DRIVEN BEAN SAMPLES
        + ANT UTILITIES

-- ADMINISTRATIVE TOOLS
        + ADMINISTRATION CONSOLE
        + ADMIN SCRIPTING
```

FIG. 9A

```
-- WAS
    -- IBM HTTP SERVER
        -- CHECKS
            -- Check memory  OK
            -- Check Disk Space OK
            -- Check CPU OK
            -- Check Windows OK
            -- Check Windows Patches OK
        -- DEPLOY
            -- Create Directory ${install.path}/IBM HTTP Server
            -- Create Directory ${install.path}/IBM HTTP Server/tmp
            -- Create Directory ${install.path}/IBM HTTP Server/bin
            -- Create Directory ${install.path}/IBM HTTP Server/register
            -- Create Directory ${install.path}/IBM HTTP Server/license
            -- Create Directory ${install.path}/IBM HTTP Server/samples
            -- Copy File ${install.from}/setup/server.zip
                        to ${install.path}/IBM HTTP Server/tmp
               ...............

-- SETUP
            -- Extract ${install.path}/IBM HTTP Server/tmp/server.zip
            -- Run ${install.path}/ IBM HTTP Server/tmp/setup/install.exe
               ...............
        -- CLEAN UP
               ...............

-- IBM DB2 UDB
        ...............

-- APPLICATION SERVER
    -- WAS
        ...............
    -- SERVER PLUG-INS
        ...............
    -- APPLICATION ASSEMBLY AND DEPLOYMENT TOOL
        ...............
    -- DEPLOYMENT TOOL
        ...............
    -- APPLICATION SERVER EXAMPLES
        ...............
    -- MESSAGE DRIVEN BEAN SAMPLES
        ...............
    -- ANT UTILITIES
        ...............

-- ADMINISTRATIVE TOOLS
    -- ADMINISTRATION CONSOLE
        ...............
    -- ADMIN SCRIPTING
        ...............
```

FIG. 9B

AUTOMATIC PARALLEL NON-DEPENDENT COMPONENT DEPLOYMENT

RELATED APPLICATIONS

This application incorporates by reference the following commonly-assigned and co-pending U.S. Patent Applications, filed on Nov. 10, 2003: U.S. patent application Ser. No. 10/705,525, entitled PRE-DEPLOYMENT COMPONENT HOSTING ENVIRONMENT ANALYZER; and U.S. patent application Ser. No. 10/705,555, entitled GENERATING SUMMARIES FOR SOFTWARE COMPONENT INSTALLATION.

TECHNICAL FIELD

The present invention relates generally to the field of enterprise data systems and, in particular, to the installation of software components across enterprise resources.

BACKGROUND ART

Figure 1A:
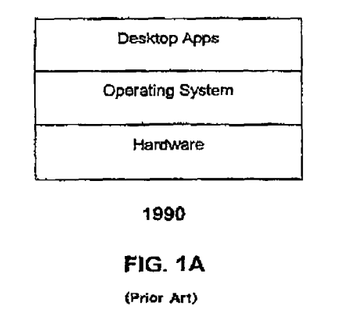
FIGS. 1A and 1B illustrate past and present, respectively, hierarchies of computer systems.
Figure 1B:
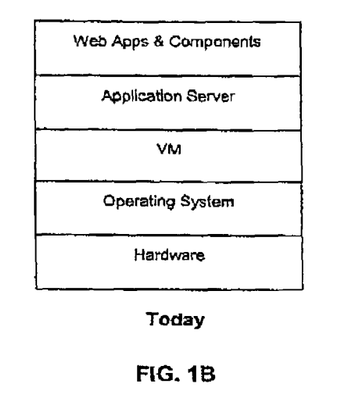

Many computer systems, a decade ago, employed hardware on which an operating system was installed to enable software applications to be run on the hardware. FIG. 1A illustrates such a simple configuration of hardware and software. More recently, however, businesses, governments, universities and others are taking advantage of large scale networks, including intranets and the internet, to allow users located virtually anywhere to easily access applications running on machines which are also located virtually anywhere. Thus, as illustrated in FIG. 1B, additional layers are required for a user at a browser client to ultimately (but transparently) access data through server-based applications. More importantly, such enterprise computing permits combining different, often incompatible, operating systems, applications and user interfaces into the same network.

Figure 2:
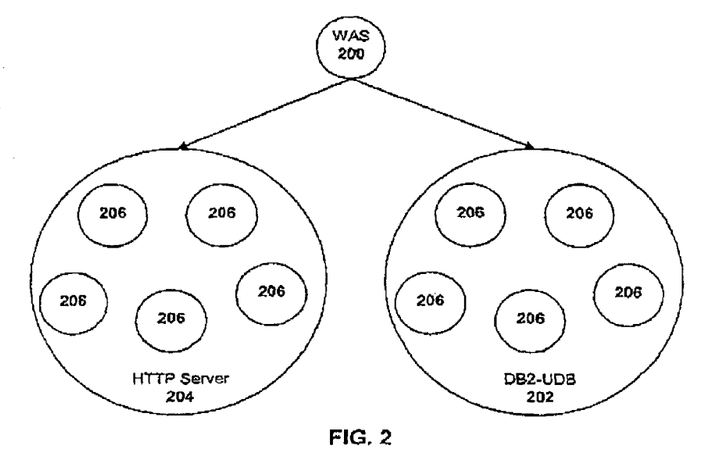
FIG. 2 illustrates a hierarchy of enterprise applications and components.

Large applications, such as application servers, may include hundreds or more individual components to install, each of which may include numerous sub-components. One example is the IBM® WebSphere® Application Server ("WAS"). In addition to the directories and files which comprise WAS, as illustrated in FIG. 2 WAS 200 also operates in conjunction with an object-oriented data base, such as IBM's DB2®-UDB 202, and an HTTP server, such as IBM's HTTP Server 204. Each of these applications comprises many components and sub-components 206. Moreover, enterprise software is frequently deployed or installed in a cluster or group of machines. Thus, when the WAS Enterprise edition is deployed, components 206 of each of the three major components (WAS 200, DB2 202 and HTTP Server 204) are installed on many machines in order to achieve a satisfactory load balancing. Heretofore, such a deployment has been a labor intensive, time consuming and error prone activity by a system administrator installing many components across many machines in a domain. And, unfortunately, heretofore, such a deployment involves installing the files sequentially, thereby adding to the time required.

An additional issue is raised due to the almost infinite number of combinations of software settings and configurations on multiple hosts with multiple parameters. Such complexity makes it extremely difficult for an administrator to devise reliable test plans to insure the validity of change to software within an enterprise. Thus, seemingly harmless upgrades, patches, or new software may wreak havoc on an enterprise infrastructure. Existing software may unintentionally be compromised or corrupted by additional software or software updates. It will be appreciated that such unforeseen consequences may cause part or even all of a business's enterprise system to fail. For example, a new JAVA Software Development Kit (SDK) is deployed each time an application, which uses JAVA is deployed. Although the JAVA SDKs are supposed to be back-compatible they are not. Furthermore, developers commonly use both SUN and IBM JAVA SDKs, introducing a number of incompatibilities. That is, JAVA applications which were functional under SUN JAVA version 1.3.1, for example, might not work properly under Sun JAVA 1.4.1 or IBM JAVA 1.3.1.

The JAVA SDK incompatibilities described above present one of the more common problems in JAVA 2 Platform Enterprise Edition (J2EE) environments. However, although very harmful, this is a relatively simple problem to detect. More complicated problems are presented at the operating system (OS) and compiler levels. Frequently at the OS level there may be incompatibilities between different versions of an OS kernel and certain applications. For instance, IBM JAVA SDK version 1.4.1 runs only with a LINUX kernel 2.2.5 or less, while the current LINUX kernel on RED HAT LINUX is 2.5. Thus a new deployment will likely update the kernel and consequently perturb the functionality of the JAVA Virtual Machine (JVM) and consequently all applications that use the JVM. A similar problem might occur with OS patches.

More subtle problems may exist at the compiler level. Although different compilers use different optimization techniques, many developers are unaware of these techniques and the differences. Thus, a syntactically correct code may run differently on two compilers. For example, IBM employs the Just in Time Compilation technique (JIT) which provides an advanced optimization for the JAVA code. Assume that certain code reads the time, then performs some computation and finally reads the time again. When an IBM compiler is used, the time difference between the two readings will be zero, because the compiler sees no dependency between the computation and the first time reading and thus will first execute the computation. In contrast, the same piece of code will run as intended using a SUN interpreter.

Un-installation of software poses a somewhat similar problem. There are large software applications which use services from other components. For instance, WAS uses the DB2-UDB and the IBM HTTP Server. If the users decide to un-install either of the latter, WAS will no longer function. Such dependencies extend from the very high level, such as the WAS/DB2-UDB/HTTP Server example, to the finer component level, such as libraries and jar files.

While some enterprise software includes the ability to "roll back" software changes, upgrades or installations, not all enterprise software includes this function. Consequently, the responsibility to identify negative repercussions and account for a multitude of configuration scenarios rests with the software developer. It will be appreciated that developers are increasingly unable to anticipate all potential problems as software scales into enterprises and enterprises themselves increase in scale.

Still further issues arise during an installation/deployment of enterprise applications. Various people involved in installing applications and supervising their installation have differing needs during the process. For example, while a supervisor may only need a high level summary of progress, an installation administrator should be able to access detailed information on a continuous basis. However, in a large enterprise deployment, there may be an overwhelming amount of installation information available. As noted above, there may be as many as 1000 or more different components being installed. Currently, all of the information may be written to a log file, as illustrated in FIG. 3, leaving the user to decipher the contents and identify failures or other problems. Alternatively, a custom program may be written to show the progress of the installation. Such a program generally includes hard coded scripts which take time to write and must be rewritten when additional components are added. Although existing install scripts may present some screens which reflect the overall progress of installation or which provide information about the feature of the application being installed, these screens do not reflect the status of the installation of the actual components. Coupled with the long period required by the installation process, the user is left with little or no information of the actual component progress and very often has to check the functions of the underlying operating system in order to determine progress or even confirm that the installer hasn't stalled but is still proceeding.

Thus, there remains a need for a more efficient installation process.

SUMMARY OF THE INVENTION

The present invention provides methods, systems, data structures encoded in computer readable media and computer program products including computer readable media for deploying software components, including deploying components in an enterprise environment. Dependency relationships among components to be deployed are determined. Those components which are not dependent upon any other component may be installed first and substantially in parallel. Components which are dependent only upon the first installed components are next installed, substantially in parallel. Installation thus progresses until all components have been installed. By installing in parallel those components having a similar level of dependency, rather than installing all components sequentially, the deployment is more efficient and requires less time to complete.

In one embodiment, a semantic model is employed which may be included in an installation package. The semantic model includes references among the components to be installed identifying deployment dependencies. In another embodiment, a data structure is employed which identifies deployment dependencies.

BRIEF DESCRIPTION OF THE DRAWINGS

Referring now to the drawings in which like reference numbers represent corresponding elements throughout:

FIG. 3 illustrates an exemplary log file displaying full details of an installation operation;

DETAILED DESCRIPTION OF THE PREFERRED EMBODIMENT

In the following description, reference is made to the accompanying drawings which form a part hereof and which illustrate several implementations. It is understood that other implementations may be utilized and structural and operational changes may be made without departing from the scope of the present limitations.

The present invention employs a "semantic model" described more fully in commonly assigned U.S. patent application Ser. No. 10/727,011, filed Dec. 3, 2003, titled AUTONOMIC ROLLBACK, which issued on Jul. 18, 2006, as U.S. Pat. No. 7,080,279, hereby incorporated by reference. Such a model, generated by the developer and included in the installation package, provides a "taxonomy" of all software components of interest, such as all software which IBM, for example, produces or uses. The model comprises a set of entries for each application, component and sub-component being installed (hereinafter collectively referred to as "components"). The model includes:

references or links among components indicating their deployment dependencies;

entries indicating what other components are necessary for the proper operation of each component being installed; and     entries indicating incompatibilities with other components likely to have been previously installed.

More specifically, the components included in the semantic model may be at a very fine level of detail, such as jar files or libraries, or may be at a coarse level, such as enterprise applications. The relationships among these components may include (but are not limited to) the following exemplary relationships:

"contains" in which a certain component contains sub-components without which the higher level component will not function;

"uses" in which a certain component is functional only in the presence of another component which is independent and not contained within the other (dependent) component;

"contradicts" in which a certain component may disable another component on the target along with components which have a "uses" relationship with the target component;

"equivalence" in which two components may be functionally interchangeable (i.e. Oracle and DB2 are both object-relational databases); and     "follows" in which a certain component must be installed after another.

The semantic model is a data structure stored in a knowledge base (as more fully described in commonly-assigned and co-pending U.S. patent application Ser. No. 10/726,192, filed Dec. 2, 2003, entitled HOSTING ENVIRONMENT ABSTRACTION AGENTS, hereby incorporated by reference). The data structure need not be any particular structure; examples of possible structures include (but are not limited to) a flat file, a database, an object model, etc stored in a computer readable medium or media that may be associated with a computer. The component semantic model is generated by the developer and may be bundled with the deployment package or accessed from a remote site during installation via the computer. In the event that deployment is to occur across domains, the model may be augmented with a list of target machines on which components will be installed.

Figure 4:
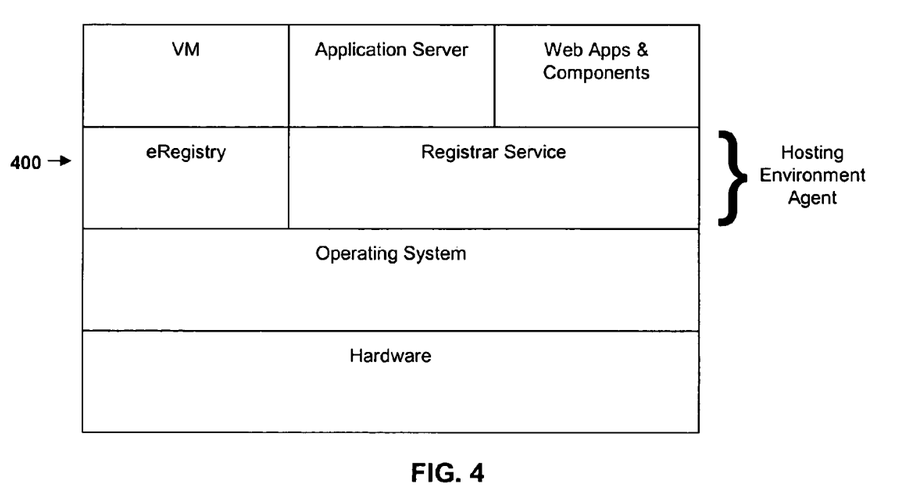
FIG. 4 illustrates a hosting environment agent as an intermediary between an operating system and higher level applications.

As illustrated in FIG. 4, the semantic model 400 serves as an intermediate structure between the operating system and higher level services. An "eRegistry" file stores a record of what has already been deployed while an "eReadMe" file stores a record of what is to be deployed. During an installation, an installation or configuration agent reads the eReadMe file and, after the installation is complete, updates the eRegistry.

Figure 5:
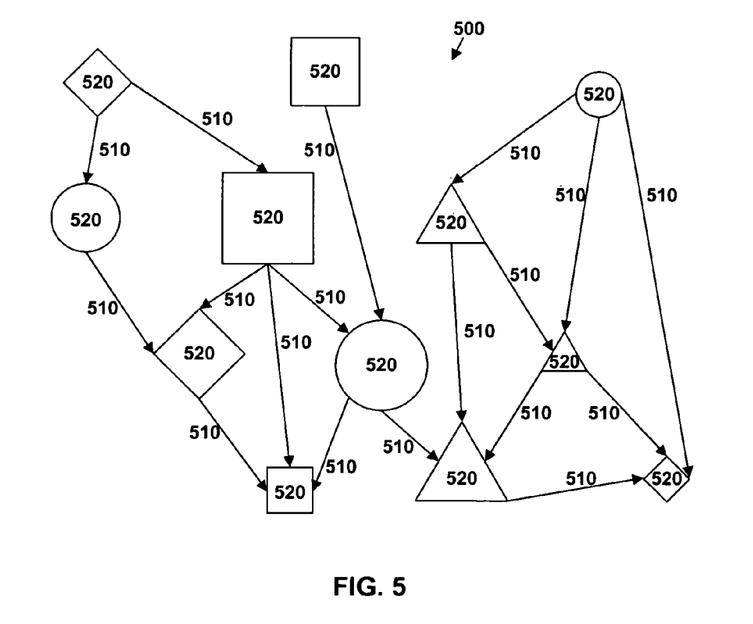
FIG. 5 illustrates a component dependency graph.
Figure 6:
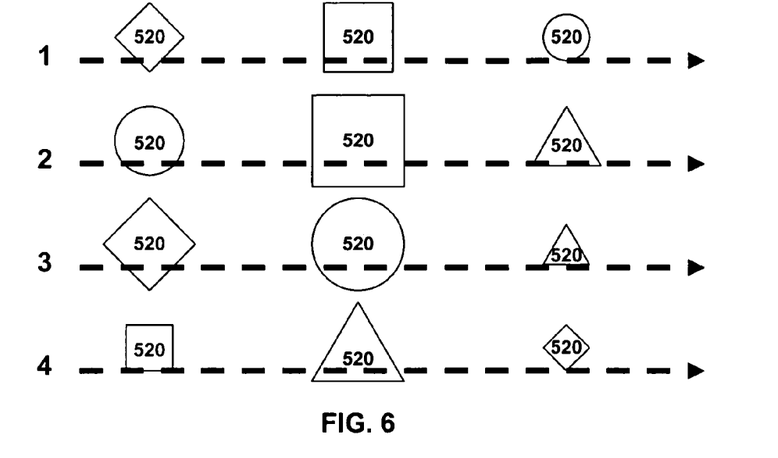
FIG. 6 illustrates grouping of similar-level components as determined from the dependency graph of FIG. 5.

The present invention includes accessing the semantic model to obtain deployment dependency information, such as in graph format, and increasing the efficiency of a deployment by installing as many components as possible in parallel. Based on the deployment dependency information, it can be determined which components must be installed before other components. FIG. 5 illustrates the make up of such a dependency graph 500 in which "directed edges" (arrows) 510 represent dependencies among components 520 by pointing from a parent (dependent) component to a child component. The child must be installed before the parent. FIG. 6 illustrates the second step in the process, that of grouping components together having like dependency levels.

More specifically, parallel installation is enabled through operating systems which support multi-threading. In order to detect the components which are suitable for parallel installation, an "acyclic directed graph" (DAG) is generated for the components which constitute an installation together with the dependency or precedence relationships among them. For instance, a deployment of WAS 5.0 involves numerous major components, five of which are: WAS, DB2, HTTP Server, Samples and Administration Tools. Each of these major components includes sub-components which in turn have further sub-components, and so on. For convenience, in FIG. 7 WAS 700 is depicted with only two Of the required components, DB2 710 and the HTTP Server 720. The directed edges in the figure depict dependencies among components. The numbers '1'-'5' identifying the components represent the order in which components may be installed in parallel, grouped in the manner illustrated in FIG. 6.

Figure 7:
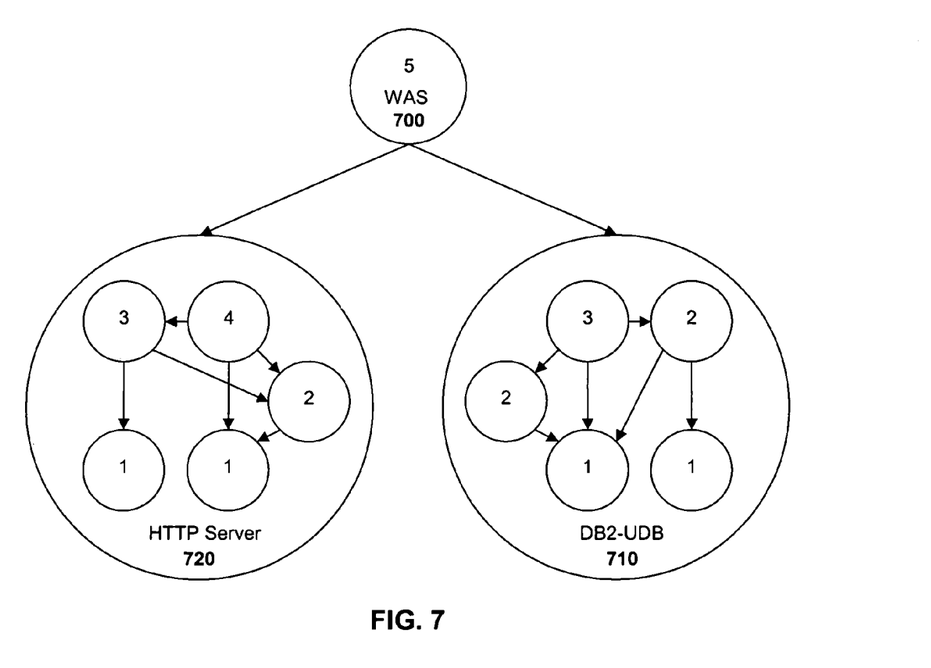
FIG. 7 illustrates an exemplary parallel deployment of WAS components.
Figure 8:
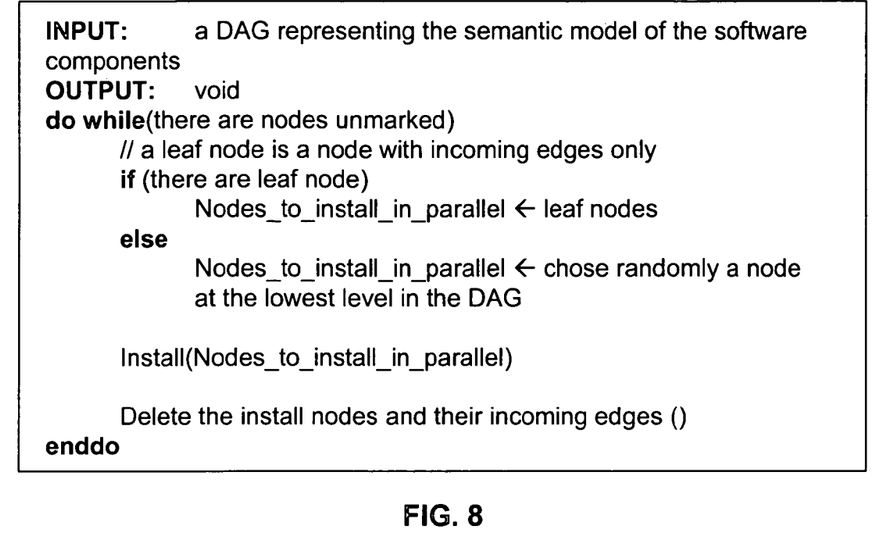
FIG. 8 illustrates an exemplary parallel deployment algorithm.

Thus, before the WebSphere Application Server 700 itself may be installed, both DB2-UDB and the HTTP Server must first be installed. However, rather than installing the components 710 and 720 one at a time, certain of the sub-components 710 and 720 may be installed in parallel (simultaneously) in a specified order. Those components which are identified with a '1' may all be installed in parallel because they depend on no other components. The components identified with a '2' may be installed next, and in parallel with each other, because those lower level components (1) on which they depend have already been installed. Similarly, the components identified with a '3' may be installed next, and in parallel with each other, because those component on which they depend (2 and 1) have already been installed. And, finally, the WAS 700 itself may be installed. Rather than the deployment requiring eleven separate levels of component installation, only five levels are needed, a significant reduction. FIG. 8 illustrates an exemplary parallel installation algorithm which may be used to implement a parallel installation.

The present invention also identifies potential component conflicts by implementing a pre-deployment hosting environment analyzer. Again the semantic model for software components is employed which captures the topology of, software components at different levels of detail as well as capturing complex relationships among components. The deployed components on the target are recorded in the eRegistry. The installation is as follows: as soon as an eReadme file is available to deploy (an eReadme captures the information about the components that are to be deployed), the eRegistry is examined and the knowledge base (as more fully described in commonly-assigned and co-pending U.S. patent application Ser. No. 10/725,612, filed Dec. 2, 2003, entitled OPTIMAL COMPONENT INSTALLATION) is accessed to download metadata about the relationship among the components to be installed and the components existing in the target. Next, the relationship data is analyzed so appropriate action may be taken in the event that a conflict is identified. For example, the installation may continue or the user may be alerted of the possible conflict. In the event installation continues, an entry may be recorded in a log for later reference. As soon the software is deployed on the target, the target eRegistry is updated with appropriate installation information.

A complementary approach is to record on the distribution media (e.g., computer readable media) information from the knowledge base pertinent to components to be deployed, including their relationships and the components targeted by these relationships. When such an approach is taken, the deployment target is not required to be accessible by an outside network, thus being appropriate for use in secure environments.

With respect to problems which may arise when a component is un-installed, the following process may be employed. When the user decides to remove a component, the configuration management software (CMS) checks the eRegistry for any relationships involving the component to be removed. If any "uses" relationships exist, the CMS will warn the user of the consequences of the un-install action. For instance, if a user decides to remove DB2-UDB while WAS is present, CMS will warn the user that this action will disable WAS. If the user decides to continue the removal, CMS will flag WAS as being "dangling". During future installations, the CMS will examine the dangling applications for possible fixes. For example, if WAS is dangling and the user decides to install Oracle, CMS will access the knowledge base and determine from the semantic model that Oracle is a functional equivalent to DB2-UDB which, if installed, will reestablish WAS to functionality. During the installation, the CMS will create an appropriate new link between WAS and Oracle by downloading and executing the necessary setup files from the knowledge base.

The present invention further includes a process for generating installation summaries which convey varying levels of information, selectable by the user, through the use of the semantic model. As previously noted, an installation may be described, such as in an eReadMe file or a dependency graph, in terms of components to be installed and their dependencies. Components may be grouped on the basis of the number of components upon which they are dependent. Those components being dependent upon the most components being grouped at the highest (least detail) level and components being dependent upon the fewest (or no) components being grouped at the lowest (most detailed) level.

The semantic model stores information about various types of dependencies. With respect to obtaining installation reports, the "contains" information is particularly relevant whereby certain components are expressed as being part of larger components. For instance, each of the major components of WAS has many other subcomponents, which, in turn, contain other subcomponents. The installation agent of the present invention accesses the semantic model and, according to the user's input, displays the requested amount of information, that is the selected granularity, about the progress of the installation. Thus, an inexperienced user may choose high level displays, displaying only the top WAS components, for example, while a system administrator may chose the lowest level of display with the finest granularity of the semantic model, such as files, libraries and jar files. The user may change the displayed level if, during installation, the user is not satisfied with the current selected level.

During installation, progress may be constantly displayed, through a GUI application, by labeling the nodes (components) in the semantic model at the user's selected level of granularity. A unique indicator (such as a different color) may represent each different status, including (without limitation) "pending", "installing", "completed" and "error". If the installation fails, the user can visually track which particular component produced the failure as well as which components have been installed. This information will help an experienced user (viewing detailed information) determine what appropriate action to take and help a less inexperienced user (viewing less detailed information) to provide the proper information to send to a customer support facility.

Figure 9A:
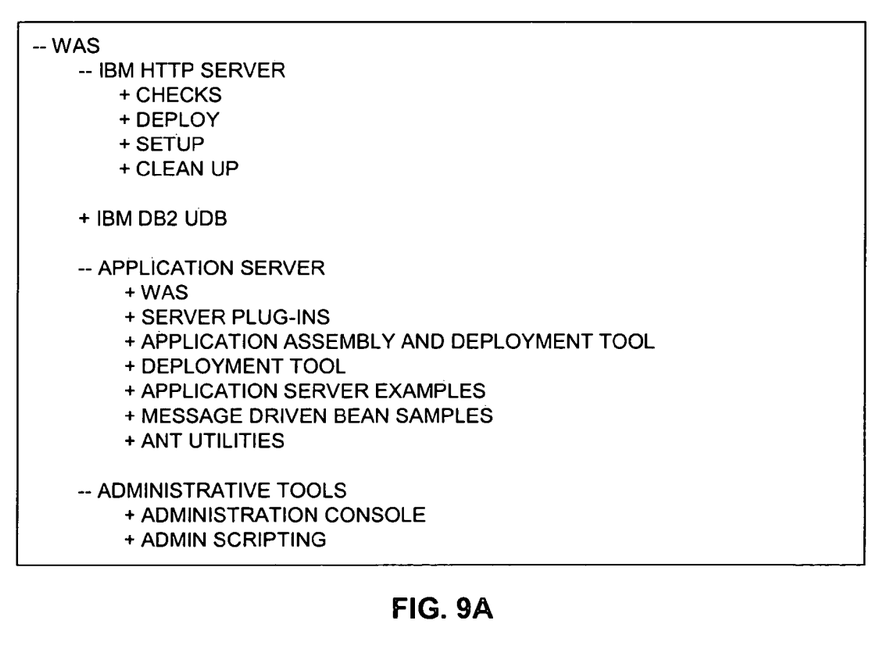
FIGS. 9A and 9B illustrate an exemplary display based upon a WAS/HTTP Server/DB2 installation.
Figure 9B:
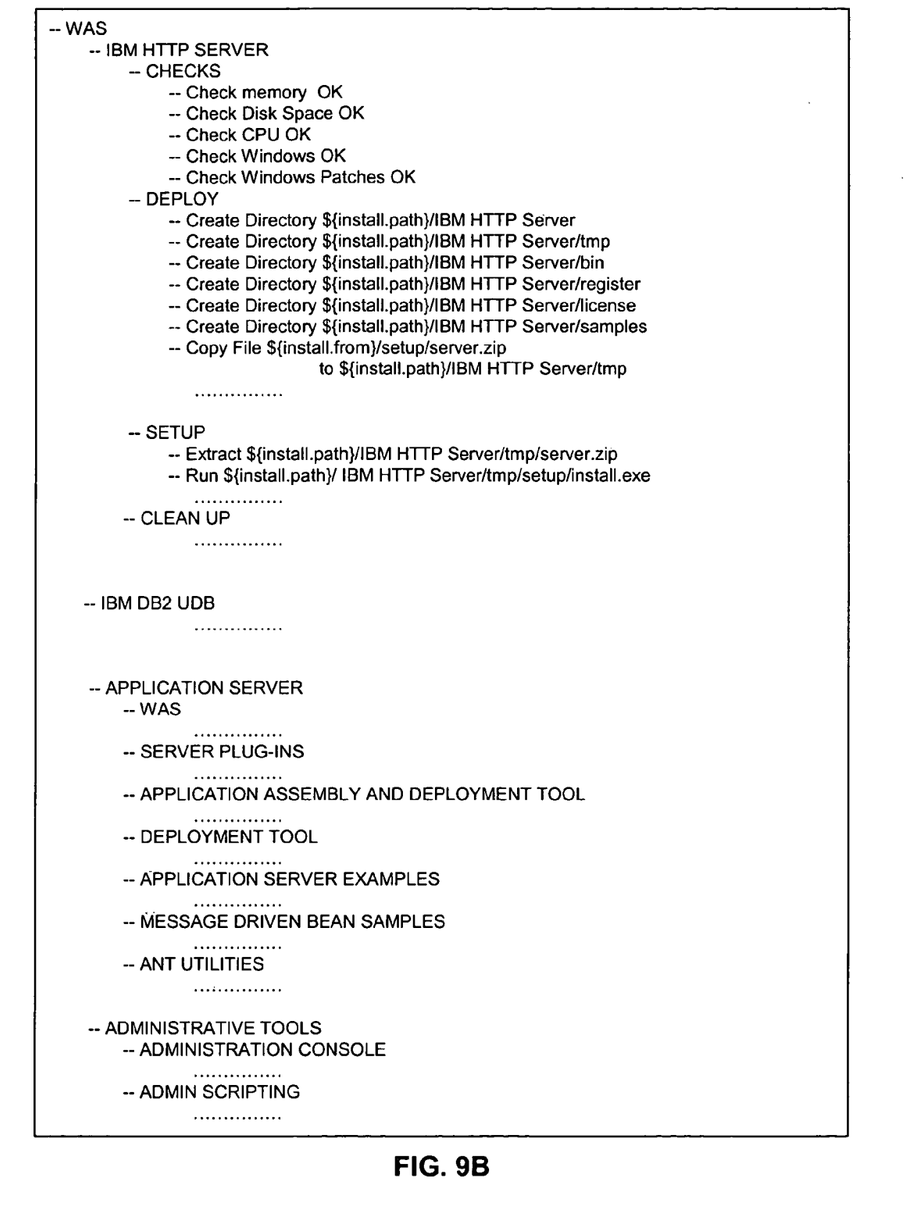

The report information may be displayed in a graphical, tree-like or directory-like structure in which the root component, at the highest level, represents the most important component (the WAS installation, for example). Less important components (the HTTP Server, for example) are displayed at successively lower levels. FIGS. 9A and 9B illustrate an exemplary display, again based upon a WAS/HTTP Server/DB2 installation. FIG. 9A illustrates an exemplary screen showing a level of detail which might be selected by a supervisor needing only general information as components deploy. FIG. 9B illustrates an exemplary screen showing a level of detail which might be selected by an administrator needing very detailed information as components deploy.

An additional feature may be included whereby, after the first installation in which a user has participated, a log is recorded of the user's selected preference indicating the level of displayed granularity. When the user participates in subsequent installations, the logged level is automatically used as the default, with the user having the opportunity to override the default.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

The invention claimed is:

1. A method for deploying a plurality of software components associated with a plurality of different applications on a computer system, comprising:
   determining, via a configuration management computing system for the plurality of different applications, parallel deployment dependency relationships between each of the plurality of software components to be installed and each other of the plurality of software components to be installed, the parallel deployment dependency relationships provided by a component semantic model that captures topology relationships among the plurality of software components;
   identifying, for the plurality of different applications, a first group of the plurality of software components to be installed, none of which is dependent upon any other software component to be installed;
   identifying, for the plurality of different applications, a second group of the plurality of software components to be installed, all of which are dependent only upon a software component in the first group;
   installing, via the configuration management computing system, the first group substantially in parallel;
   after the installation of the first group, installing, via the configuration management computing system, the second group substantially in parallel;
   wherein the first group and the second group are identified by generating a parallel acyclic directed graph comprising the parallel deployment dependency relationships; and
   wherein the plurality of different applications comprise an application server, an object oriented database, and a hypertext transfer protocol (HTTP) server.

2. The method of claim 1, wherein determining, via the configuration management computing system for the plurality of different applications, the parallel deployment dependency relationships between each of the plurality of software components to be installed and each other of the plurality of software components to be installed comprises accessing the component semantic model comprising a plurality of references among the plurality of software components to be installed that identify the parallel deployment dependency relationships.

3. The method of claim 2, further comprising loading an installation package including the component semantic model.

4. The method of claim 1, further comprising:
   identifying, for the plurality of different applications, a third group of the plurality of software components to be installed, all of which are dependent only upon a software component in the second group; and
   after the installation of the second group, installing via the configuration management computing system the third group substantially in parallel.

5. The method of claim 1, wherein installing, via the configuration management computing system, the first group and the second group substantially in parallel comprises installing the plurality of software components via the configuration management computing system across a plurality of enterprise resources.

6. A system for installing a plurality of software components associated with a plurality of different applications, comprising: a computer programmed to:
   determine, for the plurality of different applications, parallel deployment dependency relationships between each of the plurality of software components to be installed and each other of the plurality of software components to be installed, the parallel deployment dependency relationships provided by a component semantic model that captures topology relationships among the plurality of software components;
   identify, for the plurality of different applications, a first group of the plurality of software components to be installed, none of which is dependent upon any other software component to be installed;
   identify, for the plurality of different applications, a second group of the plurality of software components to be installed, all of which are dependent only upon a software component in the first group;
   install the first group substantially in parallel; after the installation of the of the first group, install the second group substantially in parallel;
   wherein the first group and the second group are identified by generating a parallel acyclic directed graph comprising the parallel deployment dependency relationships; and
   wherein the plurality of different applications comprise an application server, an object oriented database, and a hypertext transfer protocol (HTTP) server.

7. The system of claim 6, wherein, in being programmed to determine, for the plurality of different applications, the parallel deployment dependency relationships between each of the plurality of software components to be installed and each other of the plurality of software components to be installed, the computer is programmed to access the component semantic model comprising a plurality of references among the plurality of software components to be installed that identify the parallel deployment dependency relationships.

8. The system of claim 7, where the computer is further programmed to load an installation package including the component semantic model.

9. The system of claim 6, where the computer is further programmed to:
identify, for the plurality of different applications, a third group of the plurality of software components to be installed, all of which are dependent only upon a software component in the second group; and
install the software components of the third group substantially in parallel after the installation of the software components of the second group.

10. The system of claim 6, further comprising a data structure encoded in a computer readable storage media comprising references among the plurality of software components to be installed that identify the parallel deployment dependency relationships.

11. The system of claim 10, where the computer is further programmed to access the data structure encoded in the computer readable storage media.

12. The system of claim 6, where the computer is further programmed to install the first group substantially in parallel and the second group substantially in parallel across a plurality of enterprise resources.

13. A data structure encoded in a computer readable storage media and associated with a software component installation package, comprising:
an entry for each software component to be installed;
a plurality of parallel deployment dependency references associated with a first software component to be installed identifying each other software component to be installed upon which the first software component is dependent, the plurality of parallel deployment dependency references provides by a component semantic model that captures topology relationships among software components; and
a first identifier identifying a first plurality of software components to be installed which are not dependent upon any other software component to be installed;
wherein the installation package installs the software components in a sequence in accordance with the plurality of parallel deployment dependency references; and
wherein the software component installation package includes an application server.

14. The data structure encoded in a computer readable media and associated with the software component installation package of claim 13, further comprising:
a second identifier identifying a second plurality of software components to be installed, all of which are dependent only upon a software component in the first group;
wherein the installation package installs the first plurality of software components identified by the first identifier substantially in parallel and subsequently installs the second plurality of software components identified by the second identifier substantially in parallel; and wherein the first plurality of software components and the second plurality of software components are detected by generating an acyclic directed graph.

15. A computer program product comprising a computer readable storage medium usable with a programmable computer, the computer program product having computer-readable code embodied therein for installing software components, the computer-readable code comprising instructions for:
determining, for a plurality of different applications, parallel deployment dependency relationships between each of a plurality of software components to be installed and each other of the plurality of software components to be installed, the parallel deployment dependency relationships provided by a component semantic model that captures topology relationships among the plurality of software components;
identifying, for the plurality of different applications, a first group of the plurality of software components to be installed, none of which is dependent upon any other software component to be installed;
identifying, for the plurality of different applications, a second group of the plurality of software components to be installed, all of which are dependent only upon a software component in the first group;
installing the first group substantially in parallel;
after the installation of the first group, installing the second group substantially in parallel;
wherein the first group and the second group are identified by generating a parallel acyclic directed graph comprising the parallel dependency relationships; and
wherein the plurality of different applications comprise an application server, an object oriented data base, and a hypertext transfer protocol (HTTP) server.

16. The computer program product of claim 15, wherein the instructions for determining, for the plurality of different applications, the parallel deployment dependency relationships between each of the plurality of software components to be installed and each other of the plurality of software components to be installed comprise instructions for accessing the component semantic model comprising a plurality of references among the plurality of software components to be installed that identify the parallel deployment dependency relationships.

17. The computer program product of claim 16, further comprising instructions for loading an installation package including the component semantic model.

18. The computer program product of claim 15, further comprising instructions for:
identifying, for the plurality of different applications, a third group of the plurality of software components to be installed, all of which are dependent only upon a software component in the second group; and
installing the third group substantially in parallel after the installation of the second group.

19. The computer program product of claim 15, wherein the instructions for installing the first group substantially in parallel and the second group substantially in parallel comprise instructions for installing the plurality of software components first group substantially in parallel and the second group substantially in parallel across a plurality of enterprise resources.

* * * * *